3,661,973
PROCESS FOR THE PREPARATION OF ADIPONITRILE FROM ADIPIC ACID AND AMMONIA
Yuichi Suzukawa, Hisashi Kono, Kenji Terai, Atushi Kuribayashi, and Takazumi Niwa, Yamaguchi-ken, Japan, assignors to Ube Industries, Ltd., Ube-shi, Yamaguchi-ken, Japan
Filed Feb. 28, 1966, Ser. No. 803,270
Claims priority, application Japan, Mar. 5, 1968, 43/13,796
Int. Cl. C07c *121/10*
U.S. Cl. 260—465.2     3 Claims

ABSTRACT OF THE DISCLOSURE

Process for preparing adiponitrile comprising reacting adipic acid and ammonia at 250 to 550° C. in a fluidized bed of a solid dehydration catalyst fluidized by ammonia gas, wherein a part of ammonia gas preheated at high temperatures is introduced into the fluidized bed through a funnel-shaped distributor positioned at the bottom of the fluidized bed; adipic acid in form of a hot aqueous solution is sprayed into the fluidized bed through a nozzle for spraying a hot aqueous solution of adipic acid provided at the central portion of said distributor; and the rest of ammonia gas preheated at high temperatures is injected into the fluidized bed as gas jet stream from an injection opening provided at the central portion of said distributor and around said nozzle.

---

Figure 1:
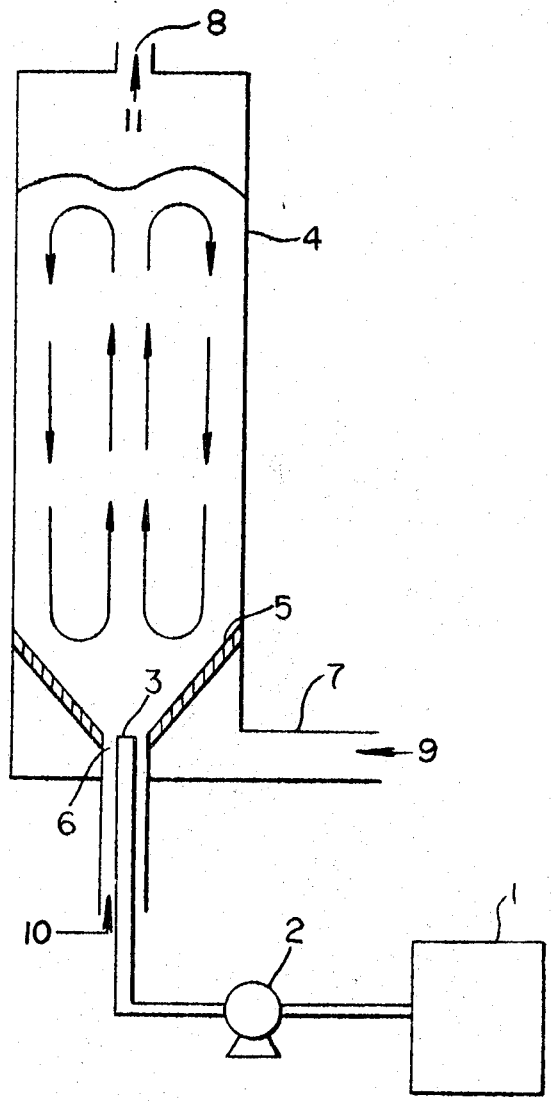

This invention relates to a process for the preparation of adiponitrile from adipic acid and ammonia by employing a fluidized bed containing particles of a dehydration catalyst. More specifically, it relates to a process for the preparation of adiponitrile which comprises spraying an aqueous solution of adipic acid from a nozzle for spraying a hot aqueous solution of adipic acid provided at the central portion of a funnel-shaped distributor positioned at the bottom of the fluidized bed and injecting a part of hot ammonia gas in form of a gas jet stream into the fluidized bed from an injection opening provided around said nozzle.

There has been heretofore known a method of producing adiponitrile which comprises contacting preliminary vaporized adipic acid and ammonia gas in the gaseous phase in the presence of a dehydration catalyst. However, in carrying out the above method, cyclopentanone is formed as by-product by the decarboxylation reaction caused to occur during vaporizing adipic acid and introducing vaporized adipic acid into the reactor, and cyanoimines are also formed as by-products inside the reactor. Under the reaction conditions, these by-products promote deposition of carbonaceous substances on the catalyst surface, which is the primary factor for degradation of the catalyst, and hence shorten the life of the catalyst. Accordingly, complicated steps are required for separation of such by-products and purification of the crude adiponitrile. Thus, the said method is industrially disadvantageous.

In order to overcome the above described disadvantages of the method introducing adipic acid in the vaporized form, the specification of U.S. Pat. 3,242,204 proposes a method for the production of adiponitrile which comprises introducing powdery adipic acid together with ammonia gas into a fluidized bed and reacting adipic acid with ammonia in the presence of a dehydration catalyst in the fluidized bed. This method is satisfactory in the respect where relatively pure adiponitrile can be obtained in high yields, but this method still involves various operational defects. To begin with, in this method, since adipic acid is introduced into the fluidized bed in the powdery state by the aeration method with ammonia gas flow, the adipic acid is not dispersed uniformly and sufficiently throughout the fluidized bed, and a part of adipic acid fed into the bed sticks in the powdery state in the vicinity of the distributor or the reactor wall, thus resulting in formation of carbonaceous substances by thermal decomposition. When adipic acid is fed into the fluidized bed in the powdery state, the adipic acid is fused and sticks to a part of an adipic acid feeder, which brings about disadvantages such as clogging of the feeder. Further, in order to keep the adipic acid stable and to prevent sticking of solid or fused adipic acid in the pneumatic transportion of adipic acid in the powdery state as well as in the adipic acid hopper, according to the said method it is necessary to use an inert gas such as nitrogen to prevent the contact of adipic acid with ammonia and also to keep the temperature of adipic acid below 50° C. When it is introduced into the fluidized bed together with the current of ammonia, the temperature of ammonia should be also kept below 50° C. Therefore there are brought about disadvantages such as accumulation of the inert gas in the reaction system and non-uniform temperature distribution in the system. Further, in the said method, though adiponitrile is obtainable in satisfactory yields at the initial stage of operation, lowering in the activity of the catalyst becomes extreme as the operation time is prolonged. This is another disadvantage of the said method.

As a result of researches made on the preparation of adiponitrile with the use of fluidized beds, we have found that the above described disadvantages of the known methods can be overcome and adiponitrile of high purity can be prepared in high yields without any above mentioned operation troubles by spraying an aqueous solution of adipic acid from a nozzle for spraying a hot aqueous solution of adipic acid provided at the central portion of a funnel-shaped distributor positioned at the bottom of the fluidized bed and injecting a part of ammonia gas preheated at 250 to 550° C. in form of a gas jet stream into the fluidized bed from an injection opening provided around said nozzle, to thereby force the catalyst particles to flow convectively and circulatingly in the bed, and arrived at this invention based on the above knowledge.

More specifically, this invention provides a process for the preparation of adiponitrile comprising reacting adipic acid and ammonia at a temperature of 250 to 550° C. in a fluidized bed of a solid dehydration catalyst fluidized by ammonia gas, wherein a part of ammonia gas preheated at high temperatures is introduced into the fluidized bed through a funnel-shaped distributor positioned at the bottom of the fluidized bed; adipic acid in form of a hot aqueous solution is sprayed into the fluidized bed through a nozzle for spraying a hot aqueous solution of adipic acid provided at the central portion of said funnel-shaped distributor; and the rest of ammonia gas is injected into the fluidized bed as a gas jet stream from an injection opening provided around said nozzle for spraying a hot aqueous solution of adipic acid at a linear velocity ($U_J$ m./sec.) higher than the average superficial velocity in empty column ($U_o$ m./sec.) of the whole ammonia gas, causing the dehydration catalyst to flow convectively and circulatingly in said fluidized bed.

In this invention adipic acid is sprayed into the fluidized bed in form of a hot aqueous solution. No specific restriction is given to the concentration of adipic acid in the aqueous solution, so long as the aqueous solution is kept stable. Generally, the adipic acid concentration in the aqueous solution is from 70 to 95% by weight, and preferably higher than 80% by weight. Such aqueous solution may be formed stably by dissolving adipic acid into hot water maintained at 80 to 145° C. under atmospheric or elevated pressure up to 4.5 kg./cm.² (gauge). In order to keep the hot aqueous solution of adipic acid in the stable state, it is preferred to pressurize the hot aqueous solution by means of an inert gas such as nitrogen, helium and argon. The hot aqueous solution of adipic acid is sprayed from a nozzle for spraying a hot aqueous solution of adipic acid provided at the central portion of an injection opening for injecting ammonia as gas jet stream by its own pressure. In this case, it is preferred to feed the hot aqueous solution of adipic acid into the fluidized bed at the point near a passage through which ammonia gas is fed as a gas jet stream.

In preferred embodiments as the nozzle for spraying a hot aqueous solution of adipic acid is used as atomizing device composed of an outer tube (for introducing ammonia to be injected) and an inner tube (for introducing a hot aqueous solution of adipic acid). In such embodiments, ammonia gas is fed from one end of the outer tube by means of a blower at the same time when the hot aqueous solution of adipic acid is introduced from one end of the inner tube by a pump, and the atomizing of the hot aqueous solution of adipic acid is performed by the aid of the ammonia gas fed from one end of said outer tube; or ammonia gas is fed from one end of the inner tube (for introducing ammonia to be injected) by means of a blower at the same time when the hot aqueous solution of adipic acid is introduced from one end of the outer tube (for introducing a hot aqueous solution of adipic acid) by a pump, and the atomizing of the hot aqueous solution of adipic acid is performed by the aid of the ammonia gas fed from one end of said inner tube.

It is possible to optionally change the diameter of the nozzle for spraying a hot aqueous solution of adipic acid and the amount of the aqueous solution of adipic acid sprayed from the nozzle.

The feed ratio of ammonia gas to adipic acid is higher than the stoichiometric ratio. Namely ammonia gas is fed in an amount of greater than 2 moles per mole of adipic acid. It is preferred to feed ammonia gas in an amount of 10 to 50 moles per mole of adipic acid. In this invention a part of ammonia gas preheated at high temperature is introduced into the fluidized bed through a funnel-shaped distributor positioned at the bottom of the fluidized bed and the rest of ammonia gas preheated at high temperatures is injected into the fluidized bed as a gas jet stream through an injection opening provided at the central portion of the distributor.

In the specification and claims the volume flow rates of the whole ammonia gas, the gas jet stream, the ammonia gas passing through the funnel-shaped distributor, and ammonia gas for atomizing the hot aqueous solution of adipic acid are defined as $V_o$, $V_J$, $V_F$ and $V_A$ (Nm.$^3$/hr.), respectively; the linear velocity of the gas jet stream when passing through the injection opening is defined as $U_J$ (m./sec.) (recalculated to the velocity at the temperature of the opening); and the average superficial velocity in empty column of the whole ammonia gas is defined as $U_o$ (m./sec.) (recalculated to the gas velocity at the temperature in the fluidized bed). When the effective diameter of the injection opening and the inner diameter of the empty column of the of the bed are defined as $d$ and $D$, respectively, the following relations are formed among the above factors;

$$Vo = V_J + V_F + V_A$$

$$Uo = \frac{Vo}{\frac{\pi}{4}D^2} \cdot \frac{273+t}{273}$$

and $$U_J = \frac{V_J}{\frac{\pi}{4}d^2} \cdot \frac{273+t'}{273}$$

Herein, $t$ is the temperature (° C.) in the fluidized bed and $t'$ is the temperature (° C.) of gas jet stream at the injection opening, the effective diameter $d$ is represented by the equation $d = \sqrt{d_1^2 - d_2^2}$ wherein $d_1$ is the diameter of the injection opening and $d_2$ is the diameter of the nozzle provided therein.

In the specification, the average linear terminal velocity of the solid catalyst particles in the upper portion of the fluidized bed is defined as $Ut$ (m./sec.) (recalculated to the velocity at the temperature of ammonia gas in the bed).

In the process of this invention, the linear velocity $U_J$ of the gas jet stream must be higher than the superficial velocity in empty column $Uo$ and be high enough to cause the dehydration catalyst particles to flow convectively and circulatingly in the fluidized bed. A preferable $U_J/Uo$ ratio is, though more or less different depending on the particle size of the dehydration catalyst, generally in the range of 1.1 to 30, especially 5 to 25. The superficial velocity in empty column $Uo$ must be high enough to fluidize particles of the dehydration catalyst, and a preferable range of the superficial velocity in empty column $Uo$ is generally from 0.1 to 10 m./sec., through it differs more or less depending on the average particles size and the size distribution of the catalyst particles. It is preferred that the ratio $V_J/Vo$ of the volume flow rate $V_J$ of the gas jet stream to the volume flow rate $Vo$ of the whole ammonium gas in the range of from 0.1 to 0.7, especially from 0.2 to 0.4. In order to prevent occurrence of a so-called blow-through phenomenon in the fluidized bed and to maintain the forced convective and circulating flow of the catalyst particles stably in the fluidized bed, it is preferred to adjust the $U_J/U_T$ ratio below 3.

One of features of this invention residues in use of a funnel-shaped distributor provided with an injection opening for injecting ammonia gas preheated at high temperatures as a gas jet stream disposed at the central portion thereof and with a spraying nozzle for spraying a hot aqueous solution of adipic acid disposed at the central portion of said injection opening. When a part of ammonia gas preheated at high temperatures is in-injected as a gas jet stream from said opening at the above described linear velocity, catalyst particles in the bed are forced to move circulating and convectively in the bed in a manner such that the particles in the center of the bed form upward streams and those in the vicinity of the bed wall form downward streams. Thus, stagnation of catalyst particles in the vicinity of the bed wall can be effectively prevented.

Generally, it is preferred that the ratio $d/D$ of the effective diameter $d$ of the injection opening to the inner diameter D of the empty column, namely the diameter of the fluidized bed is in the range of from ½ to ⅕, though more or less different depending on the particle size and size distribution of the catalyst. Further, in view of prevention of stagnation of solid catalyst particles it is preferred to use a funnel-shaped distributor having a slant angle of 45 to 60°. The hole diameter and open area of the distributor can be easily determined by simple experiments from the particle size of the catalyst and the linear velocity and volume flow rate of ammonia gas.

Any solid dehydration catalyst conventionally used in the intended reaction can be used in this invention. For instance, silica gel, boron phosphate, solid phosphoric acid catalysts and the like can be used as dehydration catalyst in this invention. The average size of the catalyst particles is preferably in the order of 0.1 to 2 mm. The use of catalyst particles having a size in the range of from 0.1 to 0.5 mm. makes it possible to reduce the amount of fed ammonia.

The reaction of forming adiponitrile from adipic acid may be carried out under known conventional conditions. The reaction temperature is between 250 and 550° C. Temperatures of 350 to 400° C. are especially preferred. The reaction temperature may be maintained by the external heating using electric heaters or heating media, or by the internal heating by means of heating elements inserted into the fluidized bed. The process may be carried out under a pressure from subatmospheric pressure to slight superatmospheric pressure.

In this invention, as described above, a part of ammonia gas preheated at high temperature is injected as a gas jet stream from an injection opening provided at the center of the funnel-shaped distributor, and thus the forced conventive and circulating movement of solid catalyst is caused to occur by this gas jet stream. This movement gives fluidized catalyst particles in the fluidized bed momenta in the axial direction of the fluidized bed and restricts their movement in the radical direction, thus causing the catalyst particles to flow convectively and circulatingly in the fluidized bed. When a hot aqueous solution of adipic acid is sprayed from a nozzle for spraying a hot aqueous solution of adipic acid provided at the central portion of the opening of the gas jet stream onto the catalyst particles under such forced convectixe and circulating movements caused by ammonia gas, the hot adipic acid aqueous solution is uniformly dispersed in the bed. With respect to the dispersed hot aqueous solution of adipic acid, water in the aqueous solution is volatilized, adipic acid is molten and then vaporized, and the reaction between adipic acid and ammonia gas is performed with the existence of dehydration catalysts, resulting in formation of adiponitrile of high purity in high yields.

For further illustration, this invention will be described hereinbelow with reference to the accompanying diagrammatic drawing which shows an example of apparatus to be used in the process of this invention.

An aqueous solution of adipic acid is sprayed from a dissolution tank or storage tank 1 into a fluidized bed 4 through a nozzle 3 for spraying a hot aqueous solution of adipic acid provided at the central portion of a funnel-shaped distributor 5 located at the bottom of the fluidized bed 4 by means of a pump 2.

The hot aqueous solution of adipic acid sprayed into the fluidized bed 4 is made, at high temperatures, in contact with fluidizing ammonia gas 9 preheated at high temperatures and blown through a fluidizing gas blowing tube 7 and the funnel-shaped distributor 5 and ammonia gas 10 is preheated at high temperatures and injected through an injection opening 6 provided at the central portion of the funnel-shaped distributor 5 as a gas jet stream to cause solid catalyst particles (not shown) to flow convectively and circulatingly in the bed. Thus, the evaporation of water in the aqueous solution of adipic acid, the melting and vaporization of adipic acid and the reaction between adipic acid and ammonia are performed, resulting in formation of adiponitrile.

The so formed adiponitrile 11 is taken out in the gaseous state from a gas discharge outlet 8 provided at the upper portion of the fluidized bed 4, and separated in a manner known per se. A part of the worn catalyst sometime flies out of the gas discharge outlet 8, but it is possible to keep the amount of the catalyst in the bed constant by replenishing a fresh catalyst into the fluidized bed.

One of the features of this invention resides in that a hot aqueous solution of adipic acid is sprayed from a nozzle 3 for spraying a hot aqueus solution of adipic acid provided at the central portion of a funnel-shaped distributor 5 positioned at the bottom of a fluidized bed 4 and a part of ammonia gas preheated at high temperatures is injected as a gas jet stream from an injection opening 6 provided around said spraying nozzle 3. By dint of this feature a sufficient and uniform contact can be attained among the hot aqueous solution of adipic acid, ammonia gas and catalyst particles, and the reaction can be allowed to advance efficiently, with the consequence that it is possible to produce adiponitrile of a purity higher than 96% in a yield higher than 94.6%.

In the drawing arrows show courses of circulation of the catalyst particles in the fluidized bed.

Figure 2:
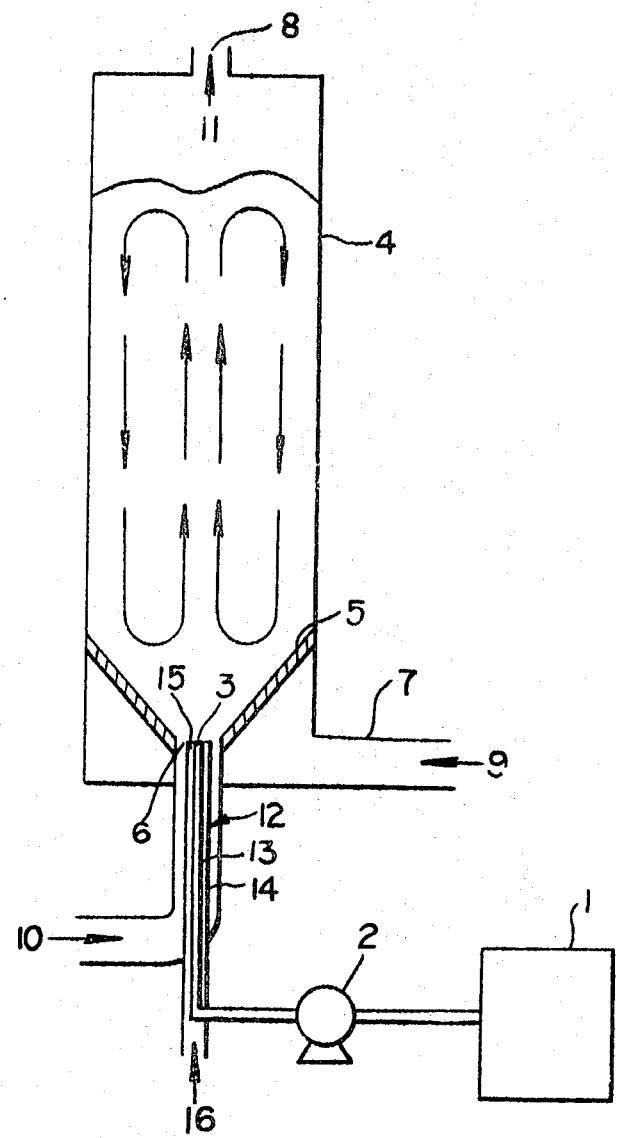

FIG. 1 is a view illustrating one embodiment of the apparatus to be used for the practice of the process of this invention. FIG. 2 is a view illustrating another specific modification of the apparatus shown in FIG. 2.

In the embodiment illustrated in FIG. 2, an atomizing device 12 for spraying a hot aqueous solution of adipic acid is provided at the central portion of a funnel-shaped distributor 5. Said atomizing device comprises an inner tube 13 and an outer tube 14. The hot aqueous solution of adipic acid is passed through the inner tube 13 and then atomized uniformly into a fluidized bed 4 from a spraying nozzle 3 by the aid of ammonia gas for atomizing introduced through the outer tube 14 and injected from an injection opening 15.

The recovery of adiponitrile from the reaction product may be carried out in a manner known per se. More specifically, the reaction product is taken out from the reactor in the gaseous state, adiponitrile is separated and recovered by the primary cooling, the non-condensate is subjected to the secondary cooling to separate and remove water formed as by-product, and the unreacted ammonia is recycled, as it is or after purification, to the primary stage of the production of adiponitrile.

In accordance with this invention, a highly uniform contact can be attained among adipic acid, ammonia and catalyst particles. Furthermore, because of the existence of the water vapor in the bed it is possible to produce adiponitrile of high purity in high yields without any substantial lowering in the activity of the catalyst even after a long time operation. Further, in accordance with this invention, sticking of adipic acid to nozzles, reactor walls, distributors, etc. can be completely prevented. Still further, since it is unnecessary to maintain adipic acid and ammonia gas at low temperatures in feeding adipic acid to the fluidized bed, it is possible not only to keep the temperature constant in the fluidized bed but also to increase the enthalpy of the reactants to be fed into the reaction system.

This invention is further illustrated by the following examples. The amounts of impurities in adiponitrile such as cyclopentanone and cyanoimines formed by the thermal decomposition of adipic acid were measured on the basis of amounts consumed of potassium permanganate.

EXAMPLE 1

Four liters of a boron phosphate catalyst having a diameter of 0.5 to 1.0 mm. were filled in a fluidized bed having a diameter of 100 mm.$\phi$ and a length of 1500 mm. and provided with a funnel-shaped distributor having a slant angle of 45°. Fluidizing ammonia gas from the distributor at a rate of 12.8 Nm.$^3$/hr. and injecting ammonia gas from an injection opening (12.6 mm$\phi$ effective diameter) at a rate of 6.4 Nm.$^3$/hr. were fed in the fluidized bed, and a hot aqueous solution of adipic acid having a concentration of 80% maintained at 120° C. and 2 kg./cm.$^2$ (gauge) is sprayed into the fluidized bed at a rate of 5.20 kg./hr. from a 2 mm$\phi$ nozzle for spraying a hot aqueous solution of adipic acid provided at the central portion of the distributor by the aid of ammonia gas for atomizing the hot aqueous solution of adipic acid at 2.0 Nm.$^3$/hr. (200° C.). The reaction was carried out at 400° C. All the ammonia gas used had been preheated at 400° C. The linear velocities of the ammonia gas were as follows:

|  | M./sec. |
|---|---|
| $U_o$ (400° C.) | 1.6 |
| $U_J$ (400° C.) | 3.5 |

The yield of adiponitrile was 94.6% and the amount of potassium permanganate consumed for impurities contained in the adiponitrile was 1.8% by weight.

EXAMPLES 2–7

A spherical boron phosphate catalyst was filled into each of longitudinal tubes having a dimension shown in Table I and provided with a funnel-shaped distributor having a slant angle of 45°. Ammonia gas preheated at the reaction temperature was fed separately from the distributor as fluidizing gas and from an injection opening provided at the center of the distributor as gas jet stream. A hot aqueous solution of adipic acid was sprayed into the fluidized bed through a 2 mm$\phi$ diameter nozzle for spraying a hot aqueous solution of adipic acid provided at the center of the injection opening by the aid of ammonia gas for atomizing the hot aqueous solution of adipic acid.

The reaction mixture from the reactor was introduced into a primary condenser maintained at 200 to 300° C. to condense adiponitrile and then into a secondary condenser to condense water and cool the unreacted ammonia gas to room temperature.

The reaction conditions and results are shown in Table I.

by nitrogen gas. The vapor and ammonia from the reactor were introduced into a condenser where adiponitrile was recovered at a rate of 1.05 kg./hr. (yield being 79%). From this control example it is seen that when the relative volume flow rate of the gas jet stream is as great as $V_J/V_O$ being 0.75, the yield of adiponitrile is decreased.

EXAMPLE 8

A silica gel catalyst (80 liters) maintained at 380° C. and having a size of 100–500$\mu$ was fluidized by ammonia gas maintained at 380° C. in a longitudinal reaction tube of an electric heating type having a length of 3400 mm. and a diameter of 300 mm$\phi$ and provided with a funnel-shaped distributor having a slant angle of 45°. The ammonia gas heated at 380° C. was fed through the distributor at a rate of 22 Nm.$^3$/hr. and through an injection opening of gas jet stream of a 52.9 mm$\phi$ effective diameter provided at the center of the distributor at a rate of 10 Nm.$^3$/hr., separately. The linear velocities of the ammonia gas were as follows:

TABLE I

|  | Example No. 2 | Example No. 3 | Example No. 4 | Example No. 5 | Example No. 6 | Example No. 7 |
|---|---|---|---|---|---|---|
| Fluidized bed: | | | | | | |
| Diameter (mm$\phi$) | 100 | 300 | 1,000 | 300 | 300 | 1,000 |
| Length (mm.) | 1,500 | 3,400 | 8,100 | 3,400 | 3,400 | 8,100 |
| d$_1$ | 22.0 | 53.9 | 206 | 53.9 | 53.9 | 206 |
| d$_2$ | 10.5 | 10.5 | 10.5 | 10.5 | 10.5 | 10.5 |
| d | 19.4 | 52.9 | 205 | 52.9 | 52.9 | 205 |
| Heating means | (¹) | (¹) | (²) | (¹) | (¹) | (²) |
| NH$_3$ gas for fluidizing (Nm.$^3$/hr) | 1.5 | 22 | 327 | 22 | 22 | 327 |
| NH$_3$ gas for gas jet stream (Nm.$^3$/hr.) | 0.5 | 10 | 165 | 10 | 10 | 165 |
| NH$_3$ gas aid for atomizing (Nm.$^3$/hr.) | 1 | 6 | 108 | 6 | 6 | 108 |
| U$_J$ (m./sec.) | 3.3 | 3.1 | 3.55 | 3.05 | 3.0 | 3.3 |
| U$_O$ (m./sec.) | 0.42 | 0.5 | 0.68 | 0.49 | 0.48 | 0.67 |
| Catalyst (boron phosphate): | | | | | | |
| Size ($\mu$) | 100–500 | 100–500 | 100–500 | 100–500 | 100–500 | 100–500 |
| Feed amount (litre) | 5.3 | 118 | 3180 | 96 | 114 | 2830 |
| Aqueous solution of adipic acid: | | | | | | |
| Adipic acid feed (kg./hr.) | 1.8 | 26 | 540 | 21 | 24 | 510 |
| Water feed (kg./hr.) | 0.1 | 1.4 | 28.4 | 5.25 | 2.9 | 61.7 |
| Concentration (percent) | 95 | 95 | 95 | 80 | 89.3 | 89.3 |
| Temperature (° C.) | 130 | 130 | 130 | 115 | 125 | 125 |
| Pressure (kg./cm.$^2$) | 3 | 2.5 | 2 | 2 | 2 | 3 |
| Reaction temperature (° C.) | 380 | 400 | 390 | 390 | 380 | 380 |
| Adiponitrile: | | | | | | |
| Amount yielded (kg./hr.) | 1.24 | 17.3 | 370 | 14.3 | 16.1 | 342 |
| Yield (percent) | 93.1 | 90.0 | 92.6 | 92.1 | 90.6 | 90.6 |
| Cyclopentanone and cyanoimine content in the product (percent) | 0.1–0.3 | 0.2–0.5 | 0.3–0.5 | 0.1–0.3 | 0.1–0.5 | 0.4–0.7 |

¹ Electric heating through outer wall.
² Electric heating inside bed and through outer wall.
NOTES—d$_1$=diameter of the injection opening; d$_2$=diameter of nozzle for spraying hot adipic acid aqueous solution; d=effective diameter of the injection opening (= $\sqrt{d_1^2-d_2^2}$).

CONTROL 1

A spherical boron phosphate catalyst (4.5 liters) maintained at 390° C. and having a size of 200 to 600$\mu$ was fluidized with ammonia gas maintained at 390° C. in a longitudinal reaction tube of an external heating type having a length of 1500 mm. and a diameter of 100 mm$\phi$ and provided with a funnel-shaped distributor having a slant angle of 45°. The ammonia gas of 390° C. was fed through the distributor at a rate of 0.5 Nm.$^3$/hr. and through a gas jet stream injection opening having an effective diameter of 19.4 mm$\phi$ and provided at the center of distributor at a rate of 3.0 Nm.$^3$/hr., separately. The linear velocities of the ammonia gas were as follows:

$$\begin{array}{ll} & \text{M./sec.} \\ U_O \text{ (390° C.)} & 0.31 \\ U_J \text{ (390° C.)} & 6.9 \end{array}$$

A hot aqueous solution, maintained at 130° C., of adipic acid was introduced into the fluidized bed from a 2 mm$\phi$ diameter hot adipic acid aqueous solution spraying nozzle positioned at the center of the ammonia gas jet stream injection opening by the aid of ammonia gas for atomizing heated at 200° C. and fed at a rate of 0.5 Nm.$^3$/hr. The hot aqueous solution had been prepared by mixing 1.8 kg./hr. of adipic acid and 0.1 kg./hr. of water in a dissolution tank and pressurized to 3 kg./cm.$^2$ $$\begin{array}{ll} & \text{M./sec.} \\ U_O \text{ (380° C.)} & 0.48 \\ U_J \text{ (380° C.)} & 3.0 \end{array}$$

A hot aqueous solution of adipic acid (adipic acid—26 kg./hr.; water—1.4 kg./hr.) pressurized to 2.5 kg./cm.$^3$ (gauge) and heated at 130° C. was introduced into the fluidized catalyst bed by the aid of ammonia gas for atomizing maintained at 200° C. and fed at a rate of 6 Nm.$^3$/hr. Adiponitrile was separated at a rate of 18.1 kg./hr. (yield being 94%) from the vapor coming from the reactor.

EXAMPLE 9

The run of Example 2 was continued over a period of time of 30 hours. Yields of adiponitrile, 4 hours, 8 hours and 30 hours after the initiation of the operation, are shown in Table II. For comparison's sake, in Table II are also shown the results of the run where Example 2 was repeated except that in accordance with the teaching of U.S. Pat. 3,242,204 specification (powder method) powder of adipic acid was used instead of the aqueous solution of adipic acid, a vertical reactor of electrical heating type having a diameter of 100 mm$\phi$ and a length of 1200 mm. and provided with a plane distributor and an opening for feeding adipic acid powder in the direction vertical to the fluidized bed was used as reactor and the ammonia gas for conveying adipic acid powder was maintained below 50° C. and fed together with a small amount of nitrogen gas to prevent solid or molten sticking of adipic acid.

TABLE II

| | Operation time | | |
|---|---|---|---|
| | 4 hours | 8 hours | 30 hours |
| Example 9, percent | 93 | 92 | 88 |
| Powder method, percent | 93 | 85 | 78 |

From the results shown in Table II it is seen that the process of this invention where adipic acid is fed in form of an aqueous solution and a part of ammonia gas is injected as a gas jet stream from an injection opening provided at the central portion of a funnel-shaped distributor is excellent over the known powder method with respect to the durability of the catalyst activity.

What we claim is:

1. A process for the preparation of adiponitrile which comprises reacting adipic acid and ammonia at a temperature of 250 to 550° C. in a fluidized bed of solid dehydration catalyst particles of an average particle diameter of 0.1–2 mm. fluidized by ammonia gas, wherein a first portion of the ammonia gas preheated at a temperature of 250 to 550° C. is introduced into the fluidized bed through a funnel-shaped distributor positioned at the bottom of the fluidized bed; adipic acid in the form of an aqueous solution of 70–95% by weight adipic acid at a temperature of 80 to 145° C. is sprayed into the fluidized bed through a nozzle provided at the central portion of said funnel-shaped distributor; and a second remainder portion of the ammonia gas preheated at a temperature of 250 to 550° C. is injected into the fluidized bed as a gas jet stream from an injection opening provided at the central portion of said funnel-shaped distributor and around said nozzle for spraying said aqueous solution of adipic acid at a linear velocity as defined by the equation $U_J/Uo = 1.1$–$30$ wherein $U_J$ represents the linear velocity of said jet gas stream and $Uo$ represents an average superficial velocity in an empty column of the entire ammonia gas, whereby the dehydration catalyst flows convectively and circulatingly in said fluidized bed, the ratio of the volume flow rate of said gas jet stream of ammonia gas, $V_J$, to the volume flow rate of the entire ammonia gas, $Vo$, being defined by the equation $V_J/Vo = 0.1$–$0.7$.

2. The process of claim 1, wherein the hot aqueous solution of adipic acid is pressurized above its own vapor pressure up to 5 kg./cm.$^2$ by an inert gas.

3. The process according to claim 1, wherein the hot aqueous solution of adipic acid is atomized into the bed with an atomizing device provided at the central portion of said funnel-shaped distributor with the aid of ammonia gas for atomizing the hot aqueous solution of adipic acid which is a part of ammonia gas to be fed into the bed and preheated up to 200° C.

References Cited

UNITED STATES PATENTS

| 3,153,084 | 10/1964 | Veazey et al. | 260—465.2 |
| 3,324,165 | 6/1967 | Baer et al. | 260—465.2 |
| 3,325,531 | 6/1967 | Mather et al. | 260—465.2 |
| 3,393,222 | 7/1968 | Schwarz et al. | 260—465.2 |

FOREIGN PATENTS

| 1,201,827 | 9/1965 | Germany | 260—465.2 |

JOSEPH P. BRUST, Primary Examiner